United States Patent
Kanatsu

(10) Patent No.: US 7,298,900 B2
(45) Date of Patent: Nov. 20, 2007

(54) IMAGE PROCESSING METHOD, IMAGE PROCESSING APPARATUS AND IMAGE PROCESSING PROGRAM

(75) Inventor: Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 10/667,413

(22) Filed: Sep. 23, 2003

(65) Prior Publication Data
US 2004/0061883 A1 Apr. 1, 2004

(30) Foreign Application Priority Data
Sep. 30, 2002 (JP) .............................. 2002-285580

(51) Int. Cl.
*G06T 7/00* (2006.01)
*G06K 9/34* (2006.01)
*G06K 9/46* (2006.01)
*G06K 9/56* (2006.01)

(52) U.S. Cl. ...................... 382/176; 382/195; 382/199; 382/201; 382/205; 382/224

(58) Field of Classification Search ................. 358/2.1, 358/462; 382/173, 176, 190, 195, 199, 201, 382/205, 224
See application file for complete search history.

(56) References Cited

U.S. PATENT DOCUMENTS 5,583,646 A * 12/1996 Yamamoto et al. ......... 358/296
5,774,580 A    6/1998  Saitoh ........................ 382/176
5,987,171 A   11/1999  Wang ......................... 382/173
2002/0085243 A1  7/2002  Kanatsu ...................... 358/453

FOREIGN PATENT DOCUMENTS

| JP | 59-142678 | 8/1984 |
| JP | 62-271080 | 11/1987 |
| JP | 07-152920 | 6/1995 |
| JP | 07-192084 | 7/1995 |
| JP | 08-235349 | 9/1996 |

* cited by examiner

*Primary Examiner*—Scott A. Rogers
(74) *Attorney, Agent, or Firm*—Fitzpatrick Cella Harper & Scinto

(57) ABSTRACT

The present invention relates to an image processing method, an image processing apparatus and an image processing program for dealing with inverted characters (outlined characters) constituted by white pixels on a black ground in a tree structure same as that of normal characters constituted by black pixels on a white ground.

In the present invention, black pixel blocks and white pixel blocks are sampled recursively from a binary image, tree structure data indicating a positional relation between the sampled black pixel blocks and white pixel blocks is created, an inverted image is created by white-black-inverting the insides of black pixel blocks that can include inverted characters, of black pixel blocks included in the tree structure data, white pixel blocks and black pixel blacks are sampled from the created inverted image, and data regarding the sampled white pixel blocks and black pixel blocs is added to corresponding nodes of the tree structure data.

23 Claims, 23 Drawing Sheets

FIG. 11

| d \ n | 1 | 2 | 3 | 4 | 5 | 6 | 7 |
|---|---|---|---|---|---|---|---|
| NW | NE | N | NW | W | SW | S | SE |
| W | NW | W | SW | S | SE | E | |
| SW | NW | W | SW | S | SE | E | NE |
| S | SW | S | SE | E | NE | N | |
| SE | SW | S | SE | E | NE | N | NW |
| E | SE | E | NE | N | NW | W | |
| NE | SE | E | NE | N | NW | W | SW |
| N | NE | N | NW | W | SW | S | |

FIG. 12

| d \ n | 1 | 2 | 3 | 4 | 5 | 6 | 7 |
|---|---|---|---|---|---|---|---|
| NW | *1 | *1 | *1 | *1 | *2 | *2 | *2 |
| W  | *4 | *4 | *3 | *3 | *3 | *3 |    |
| SW | *4 | *4 | *3 | *3 | *3 | *3 | *2 |
| S  | *3 | *3 | *3 | *3 | *2 | *2 |    |
| SE | *3 | *3 | *3 | *3 | *2 | *2 | *2 |
| E  | *4 | *4 | *1 | *1 | *1 | *1 |    |
| NE | *4 | *4 | *1 | *1 | *1 | *1 | *2 |
| N  | *1 | *1 | *1 | *1 | *2 | *2 |    |

*1: LABEL C IS APPLIED WHEN LABEL A IS ALREADY APPLIED
    IN OTHER CASE, LABEL B IS APPLIED

*2: LABEL C IS APPLIED

*3: LABEL C IS APPLIED WHEN LABEL C IS ALREADY APPLIED
    IN OTHER CASE, LABEL A IS APPLIED

*4: LABEL D IS APPLIED

EXAMPLE OF RECTANGULAR BLACK PIXEL BLOCK (LEFT)
AND NON-RECTANGULAR BLACK PIXEL BLOCK (RIGHT)

IMAGE PROCESSING METHOD, IMAGE PROCESSING APPARATUS AND IMAGE PROCESSING PROGRAM

BACKGROUND OF THE INVENTION

1. Field of the Invention

The present invention relates to an image processing method, an image processing apparatus and an image processing program.

2. Related Background Art

In recent years, information has been increasingly electronified, and thus demand for converting a paper document and an electronified document into each other has been growing. For electronifying a paper document, it is desirable that the printed side of a paper is not just photoelectric-converted into image data using a scanner or the like, but a document image is divided into areas of different natures such as texts, symbols, graphics, photographs and tables, and an optimum format of data is applied for each area such as character code information for character portions, vector data for graphics, lines and table frames, image data for photographs and structural data for contents of tables.

In this way, in processing for electronifying a paper document, processing for analyzing the contents written in a document image to divide the contents into sectional areas of different natures such as characters, graphics, photographs and tables, namely area division processing is of great importance.

For the methodology of this area division processing, it has been proposed, for example, that a document image read with multi-values (grayscale or color) as shown in FIG. 21 is converted into a binary image with a difference in luminance, pixel blocks having black pixels in outlines, existing in the image, are all extracted and classified into characters and non-characters according to their sizes, and pixels are searched recursively from the insides of white pixel areas existing in non-character large black pixel blocks, whereby a situation of pixel blocks is expressed with a hierarchical tree structure shown in FIG. 16. The image is divided into areas having a variety of attributes by processing of grouping character pixel blocks present in the same level of hierarchy to obtain a character area, obtaining graphics and photograph areas from the shapes of non-character pixel blocks and peripheral conditions, obtaining a front area as a set of pixels constituting a hierarchy, and so on, for the tree structure of pixel blocks, whereby an area division result shown in FIG. 22 can be obtained. Furthermore, at this time, information suitable for determination of logical structure of a document is provided by making each area having a tree structure shown in FIG. 23.

In this area division processing, however, it is not easy to sample an area of luminance inverted characters included in FIG. 21, namely an area of characters constituted not by black-on-white pixels but by white-on-black pixels (inverted character, outlined character) on a binary image, in terms of configuration of processing. In addition, it has been proposed that the numbers of black and white pixels are compared to each other, and the pixels are inverted if it is determined that the number of black pixels is larger, whereby inverted characters can be recognized, but it is difficult to obtain a correlation between normal characters and inverted characters, and it is thus impossible to obtain from a document including both normal characters and inverted characters a tree structure dealing with collectively normal characters and inverted characters of the document.

SUMMARY OF THE INVENTION

For solving the problems described above, the present invention is characterized in that black pixel blocks and white pixel blocks are sampled recursively from a binary image, tree structure data indicating a positional relation between the sampled black pixel blocks and white pixel blocks is created, an inverted image is created by white-black-inverting the insides of black pixel blocks that can include inverted characters, of black pixel blocks included in the tree structure data, white pixel blocks and black pixel blacks are sampled from the created inverted image, and data regarding the sampled white pixel blocks and black pixel blocs is added to corresponding nodes of the tree structure data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows a table for determining tracking directions;

FIG. 12 shows a table for obtaining a label to be applied to a referred pixel;

DESCRIPTION OF THE PREFERRED EMBODIMENTS

Figure 1:
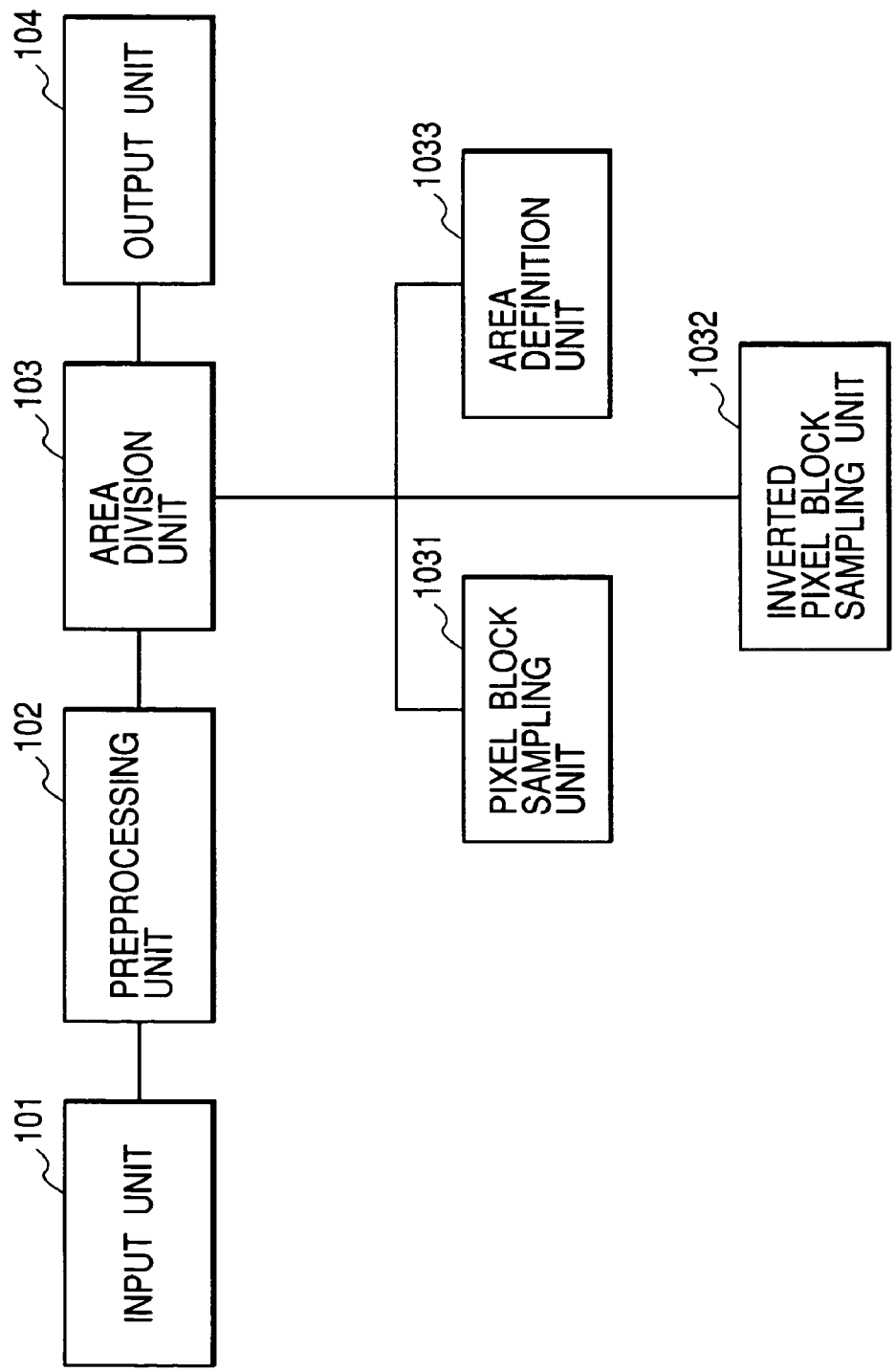
FIG. 1 is a block diagram showing a configuration of the first embodiment.

A block diagram of this embodiment is shown in FIG. 1.

Reference numeral 101 denotes an input unit for inputting image data created by photoelectric-converting a paper document, reference numeral 102 denotes a preprocessing unit for subjecting inputted image data to preprocessing such as binarization, size reduction and noise reduction, and reference numeral 103 denotes an area division unit for dividing image data into areas for attributes such as characters, lines, graphics and tables. Furthermore, the area division unit 103 is comprised of a pixel block sampling unit 1031 for sampling black pixel blocks and white pixel block to create a tree structure data (hierarchical structure data) of pixel blocks, an inverted pixel block sampling unit 1032 for adding inverted character information to tree structure data of pixel blocks, and an area definition unit 1033 for classifying areas for attributes in tree structure data of pixel blocks. Reference numeral 104 denotes an output unit for outputting information of the result of performing division of areas obtained from an image (tree structure data of areas).

Figure 2:
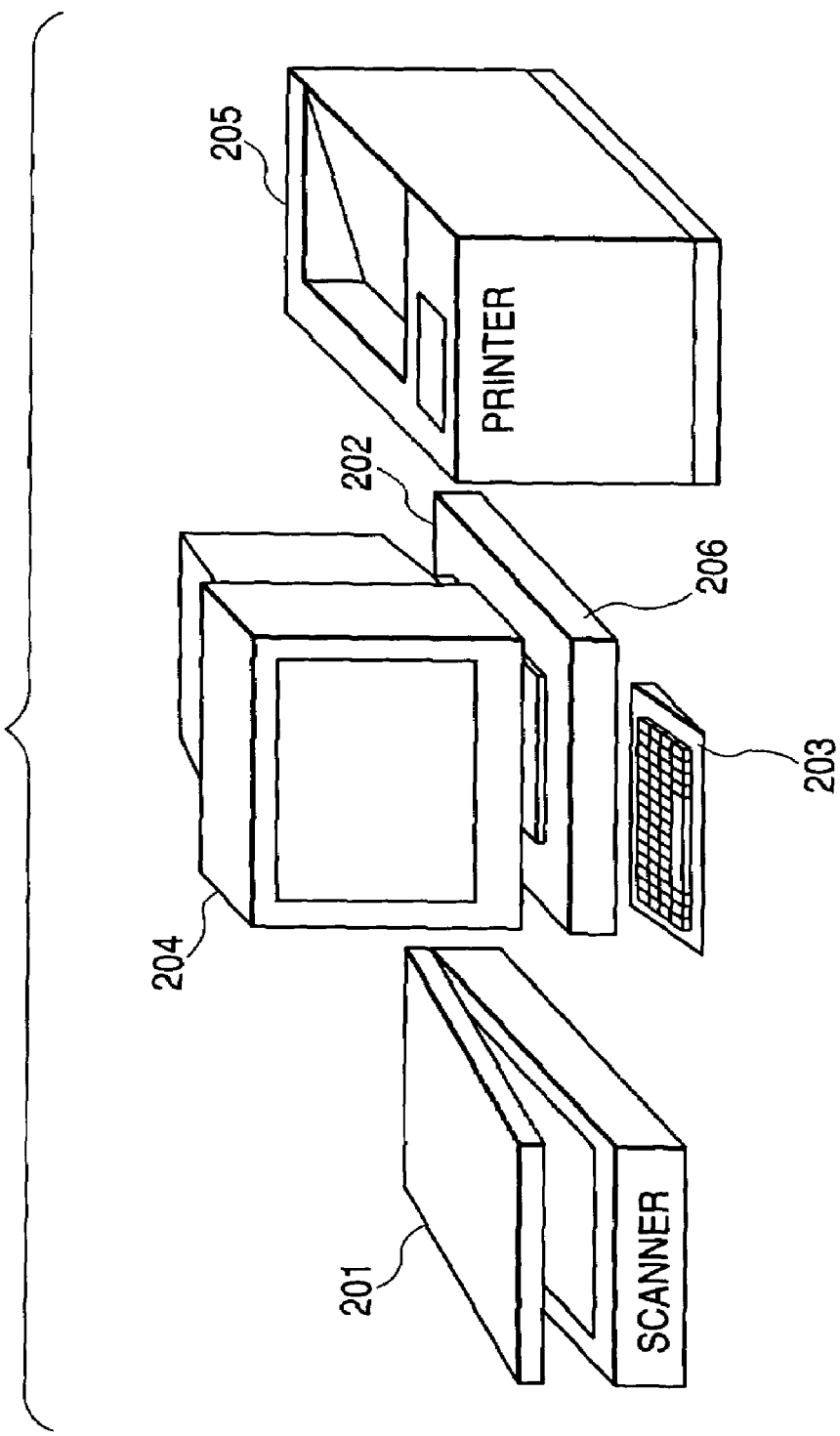
FIG. 2 shows an example of a configuration of apparatus to realize the first embodiment.

A schematic diagram of a configuration of apparatus for realizing this embodiment is shown in FIG. 2. A scanner apparatus 201 performs a photoelectric conversion operation of the input unit 101 to input image data. A computer apparatus 202 performs preprocessing 102 and area division processing 103, and receives operational control from a user through instruction means 203 such as a keyboard and a mouse. Data created by area division processing is outputted to a storage medium installed in a computer such as a hard disk, a display 204, a printer 205, other apparatuses via a network, and the like.

Furthermore, the computer apparatus for performing this embodiment is comprised of a CPU for performing actual process operations, an RAM for reading a program for use as a work area, storage media for storing programs for performing processing corresponding to flowcharts to be described later, and various kinds of data (hard disk, ROM, removal disk (floppy (R) disk, CD-ROM, etc.) or the like), a keyboard and a pointing device for carrying out various kinds of operations, a display for displaying a document or the like to be processed, a network interface for establishing connection with a network, and the like. An image processing program to be executed by the CPU may be supplied from the storage medium, or may be read from an external apparatus via a network. Furthermore, a program is executed in CPU to realize this embodiment, but part or all of the processing thereof may be performed by hardware (electric circuit).

The procedure of image processing performed in this embodiment will be described using FIG. 4.

At step S301, a paper document is read by a scanner or the like to create image data, and the image data is inputted to the computer.

At step S302, image data is converted into a binary image suitable for performing subsequent area division processing in the preprocessing unit 102. Specifically, if the inputted image data is a multi-valued image such as color or gray scale, binarization processing for adaptively setting a threshold value and converting the image data into a binary (in this embodiment, the pixel value of a black pixel is considered as 1, and the pixel value of a white pixel is considered as 0), and noise reduction processing for removing isolated points and the like are carried out. Furthermore, for carrying out processing of area division of the image at a high speed, processing for changing the size of inputted image-data to an appropriate image size (conversion of resolution of document images) may be carried out. For example, the processing is carried out by OR scaledown such that the pixel value is set to a representative value 0 when the values of pixels in the 2×2 range are all 0 if the image resolution is reduced to ½ (when the values of pixels in the 4×4 range are all 0 if the image resolution is reduced to ¼), and the pixel value is set to 1 in other cases.

At step S303, pixel block sampling processing 1031 in the area division unit 103 is performed, in which blocks of black pixels and white pixels are recursively sampled to create a tree structure. This pixel block sampling processing will be described in detail using the flowchart of FIG. 4.

At step S401, a black pixel block surrounded by 8 connected lines is sampled. Processing proceeds to S402 if the black pixel block can be sampled, and processing proceeds to S408 if it cannot be sampled. Furthermore, the black pixel block surrounded by 8 connected lines refers to a set (area) of black pixels sampled by detecting black pixels contacting in any of longitudinal, lateral and slanting directions to track the outline of a set of black pixels. Hereinafter, this set is referred to as a black pixel block. Furthermore, this black pixel block is independent of whether pixels other than outline pixels are white or black, and may have voids of white pixels therein. Furthermore, for the method for tracking the outline of these black pixels, a well known method can be used, and the outline of black pixel block sampling processing will be briefly described below using FIG. 5.

At step S501, a binary image (constituted by white pixel value 0 and black pixel value 1) is line-scanned in order from top-left to search a point having a pixel value of 1 (black pixel). For example, the image is scanned on a line-by-line basis to search a black pixel in an order shown by the arrow of 801 in FIG. 8.

At step S502, whether a black pixel has been found or not is determined, and if the black pixel has been found, processing proceeds to step S503, where outline sampling processing is started, with the black pixel as a starting point and also referred point Q. On the other hand, it is determined at step S502 that no black pixel has been found, processing is ended. For example, a pixel 810 is a starting point and also first referred point Q in FIG. 8.

Figure 10:
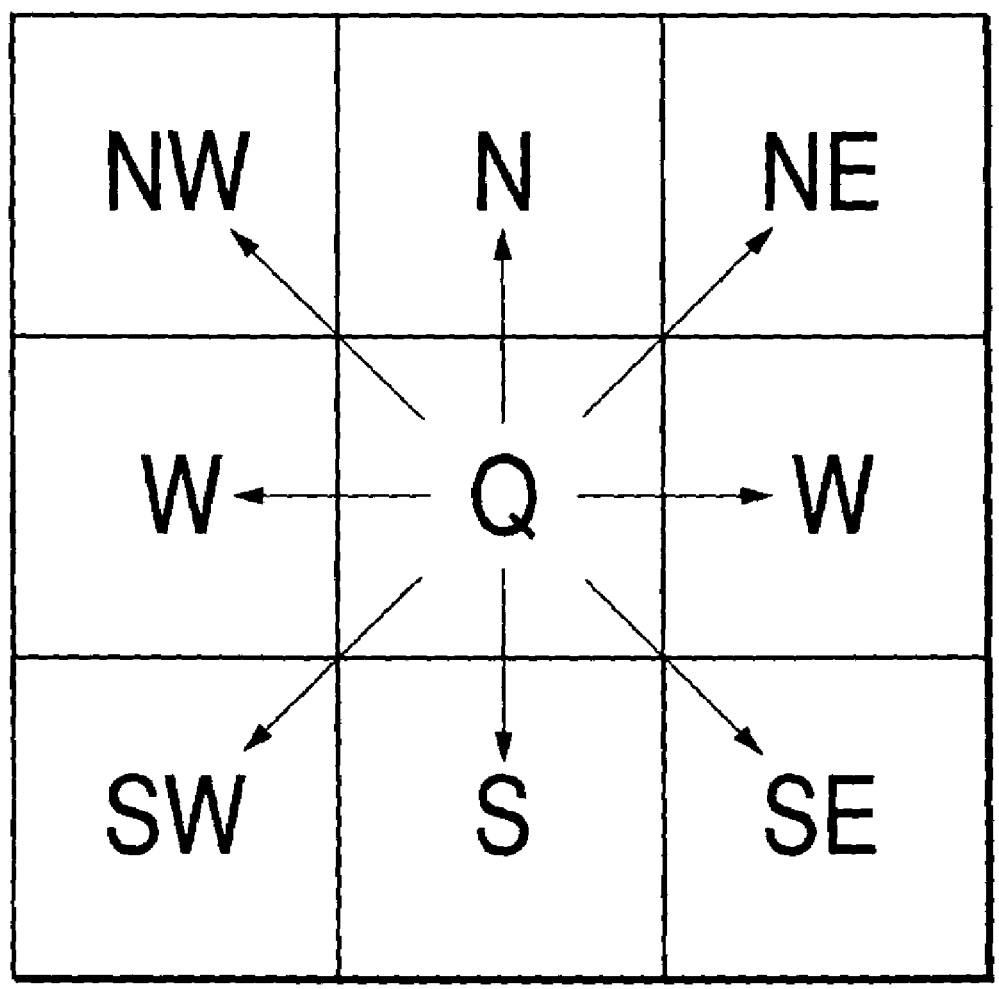
FIG. 10 shows eight tracking directions.

At step S503, peripheral pixels are checked in an order described in the table of FIG. 11 based on a preceding tracking direction d (direction of tracking from a preceding pixel toward the referred point Q) and states of peripheral pixels, whereby a tracking direction d' from the referred point Q to a next outline pixel is defined. Here, the tracking direction is represented by any of eight directions N, NE, E, SE, S, SW, W and NW as shown in FIG. 10. In addition, as exceptional processing, the preceding tracking direction d is defined as SE at the first referred point Q (starting point). The table shown in FIG. 11 shows an order n in which pixels around the referred point Q is checked with respect to the preceding tracking direction d. If the preceding tracking direction d is SW, for example, peripheral pixels are checked counterclockwise in order from pixels in the NW direction when viewed from the referred point Q (pixels in the NW direction, pixels in the W direction, pixels in the SW direction . . . are checked in this order), and at the time when a black pixel is found, the checking of peripheral images is ended, and the direction in which the black pixel is found is defined as the tracking direction d'. By checking peripheral images in the order shown in FIG. 11, pixels checked in defining the preceding tracking direction d are prevented from being checked when the next tracking direction d' is defined.

At step S504, a label indicating an outline pixel is applied to the pixel of the referred point Q. There are four types of labels, i.e. "A", "B", "C" and "D", and in the area surrounded by the outline, the label A is applied to pixels corresponding to the edge of the left end, the label B is applied to pixels corresponding to the edge of the right end, the label C is applied to pixels corresponding to both left and right edges, and the label D is applied to outline pixels corresponding to neither left nor right edges. This label value is determined from the preceding tracking direction d and next tracking direction d' and the current label value of Q by using FIGS. 11 and 12.

At step S505, a pixel in the nest tracking direction d' is defined as a new referred point Q, and the tracking direction d' is substituted in the preceding tracking direction d.

At step S506, whether the new referred point Q equals the starting point or not is determined, and if it equals the starting point, then processing proceeds to step S507, and if it does not equal the starting point, then processing returns to step S503, where tracking processing is carried out again.

Figure 8:
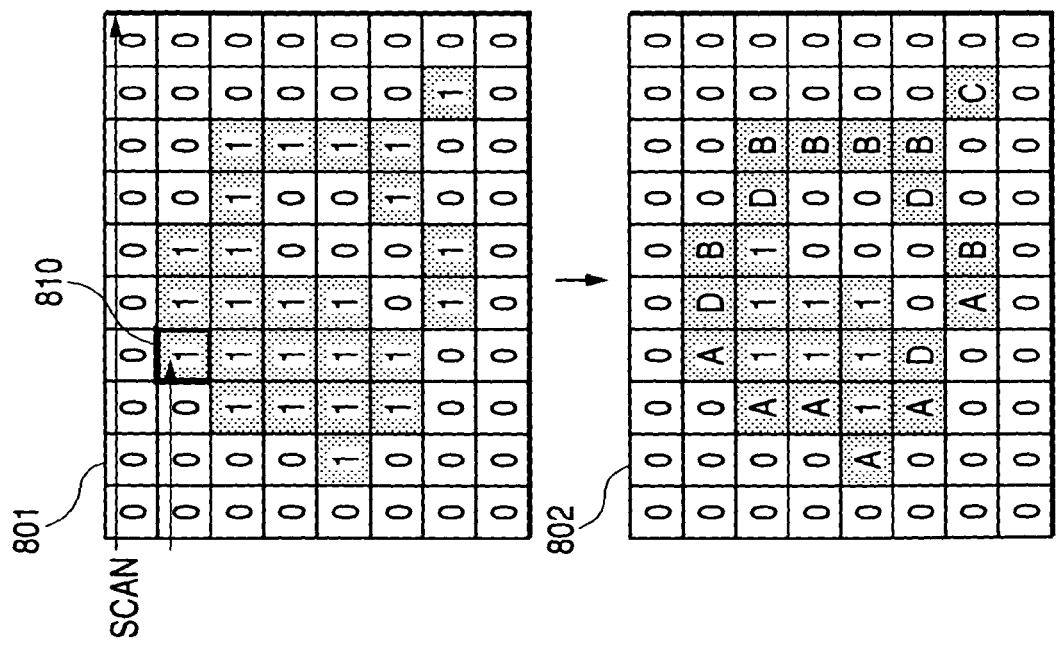
FIG. 8 shows an example of pixel block sampling processing by outline tracking.

Processing performed at steps S503 to 506 will be described using an example 801 in FIG. 8 as an example. First, the starting point 810 is defined as a first referred point Q, and pixels are checked from pixels in the direction SW in the order shown in FIG. 11. Here, a black pixel is found in the next tracking direction d'=SW (n=1) from the first referred point Q (810), and referring to FIG. 12, the label "A" is applied to the referred point Q (pixel 810), and thereafter the referred point Q moves to lower-left. Subsequently, processing is repeated in the same manner to obtain an outline labeled as shown in an example 802 in FIG. 8.

At step S507, whether an additional branch exists in the referred point Q (starting point) is checked. The determination of whether an additional branch exists is made if the preceding tracking direction d is NE, and it is determined that no additional branch exists if the preceding tracking direction is not NE. If the preceding tracking direction d is NE, pixels in the SE direction and pixels in the E direction are checked in this order when viewed from the referred point Q to determine whether a black pixel exists for pixels around the referred point Q, and at the time when a black pixel is found, it is determined that an additional branch exists, and the referred point Q is moved in the direction d' in which the branch exists and the tracking direction d' is substituted in the preceding tracking direction d, and then processing returns to step S503. On the other hand, if no additional branch exists, processing proceeds to step S509.

At step S509, a block of pixels surrounded by outline-labeled black pixels is recorded as one black pixel block. Specifically, as an example 803 in FIG. 8, sequent pixels between a pair of the left edge label "A" and the right edge label "B", or a single "C" pixel are defined as one segment for each y coordinate (pixel line), and a pixel block is recorded as a set of the segments. Furthermore, in the example 803 in FIG. 8, for the sake of easy explanation x and y coordinates have as an origin a rectangular upper-left point circumscribed with the black pixel block, but preferably the x and y coordinates have as an origin an upper-left point of the image scaled down at S302.

Furthermore, after the sampling of one pixel block is completed (after processing at S509 is completed), the sampled pixel block is subjected to attribute classification at steps S402 to S407, and then processing returns to S501, where line scanning is carried out again beginning with a pixel adjacent to the previous starting point on the right side to search a next starting point. However, searching is skipped for pixels insides the outlines of black pixel blocks already obtained at this time, namely a pixel of pixel value="1" is searched ignoring pixels overlapping with segments of black pixel blocks already found.

Figure 4:
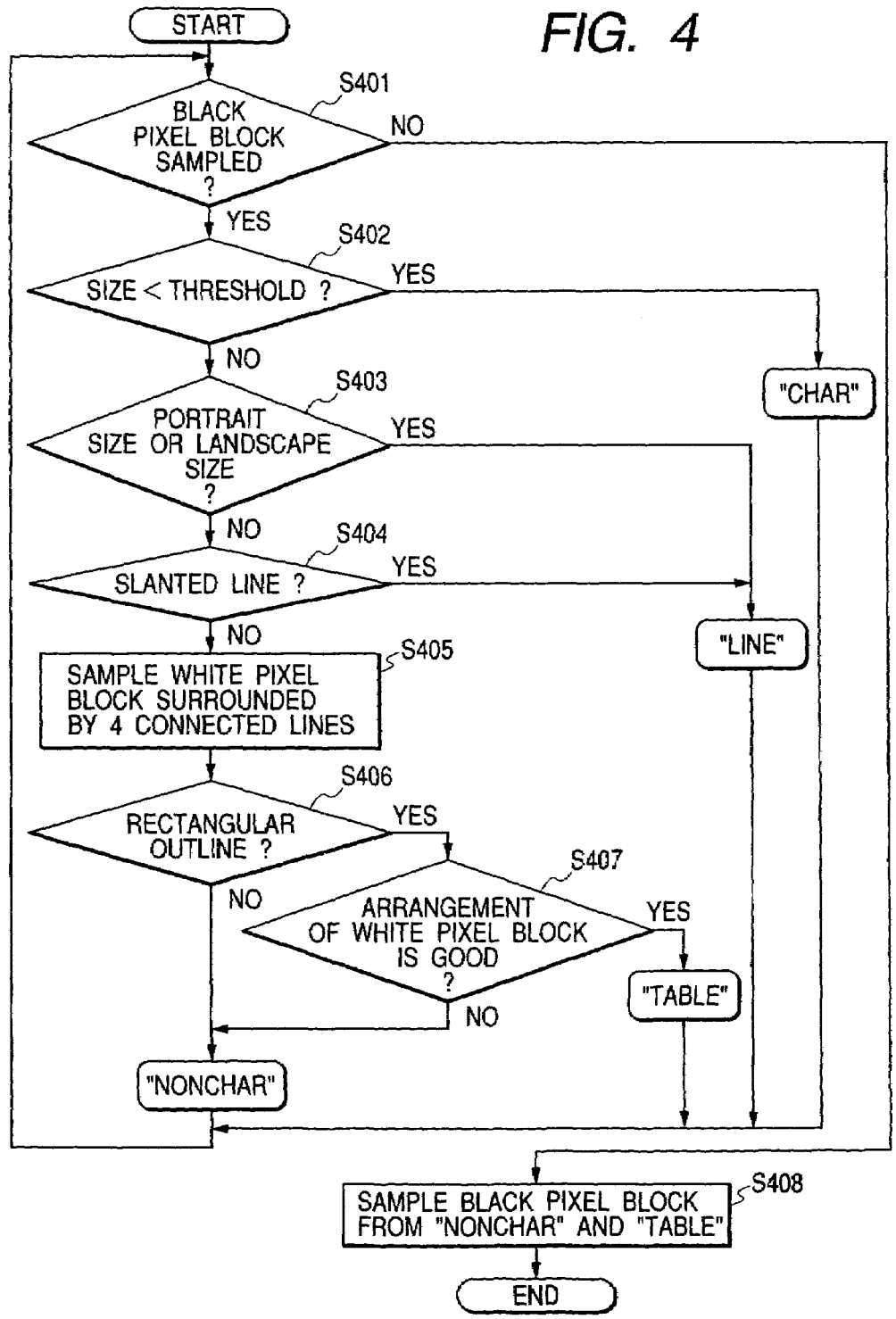
FIG. 4 is a flowchart for explaining pixel block sampling processing.
Figure 5:
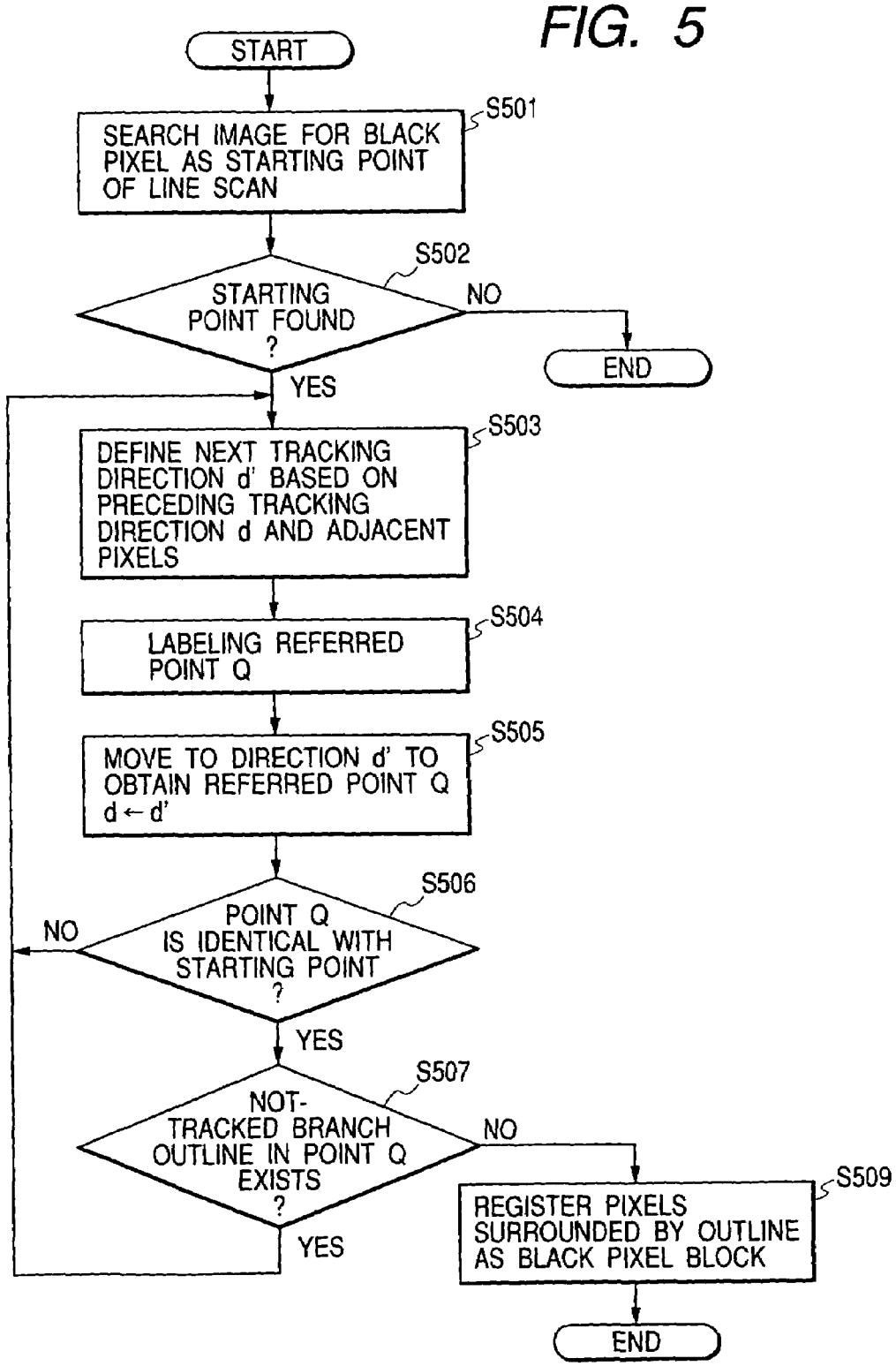
FIG. 5 is a flowchart for explaining processing of tracking the outline of black pixels.

Referring to FIG. 4 again, attributes are classified in processing subsequent to step S402 using the shapes of black pixel blocks and the shapes of circumscribed rectangles circumscribed with black pixel blocks for all black pixel blocks sampled in processing at step S401 (processing in FIG. 5).

At step S402, if the size of the subscribed rectangle of a black pixel block is equal to or less than a threshold value predefined for a maximum character height and width predicted in advance, it is determined that the black pixel block is a character element. An attribute of "CHAR" is given to this black pixel block.

At step S403, the subscribed rectangular of a black pixel block is longitudinally long or laterally long in size in a ratio equal to or greater than a predetermined ratio, an attribute of "LINE" is given to the black pixel block.

At step S404, attention is focused on an outline constituted by black pixels in a black pixel block, and if it is determined that the shape thereof is of slender slanting line, an attribute of "LINE" is given to the black pixel block.

At step S405, white pixel blocks surrounded by 4 connected lines existing in black pixel blocks other than "CHAR" and "LINE" are sampled. The white pixel block surrounded by 4 connected lines is a pixel set surrounded by an outline of longitudinally and laterally connected white pixels. Hereinafter, this set is referred to as a white pixel block.

The method for sampling a white pixel block is such that in black pixel outline sampling processing described with FIG. 5, "0" and "1" are inverted, and only connected lines in longitudinal and lateral four directions (N, E, S, W) are permitted with no consideration given to connected lines in slanting directions to sample an outline of white pixels. Otherwise, the track may move out of the black pixel block having a referred point as a base. Because of this limitation, similar processing is carried out without making determinations for slanting directions as tracking directions, in tables of FIGS. 11 and 12, in processing equivalent to step S503 in FIG. 5. Furthermore, a table for tracking an outline of white pixels may be prepared instead of the tables of FIGS. 11 and 12 and in this case, the table is very small because there are only four tracking directions.

Figure 13:
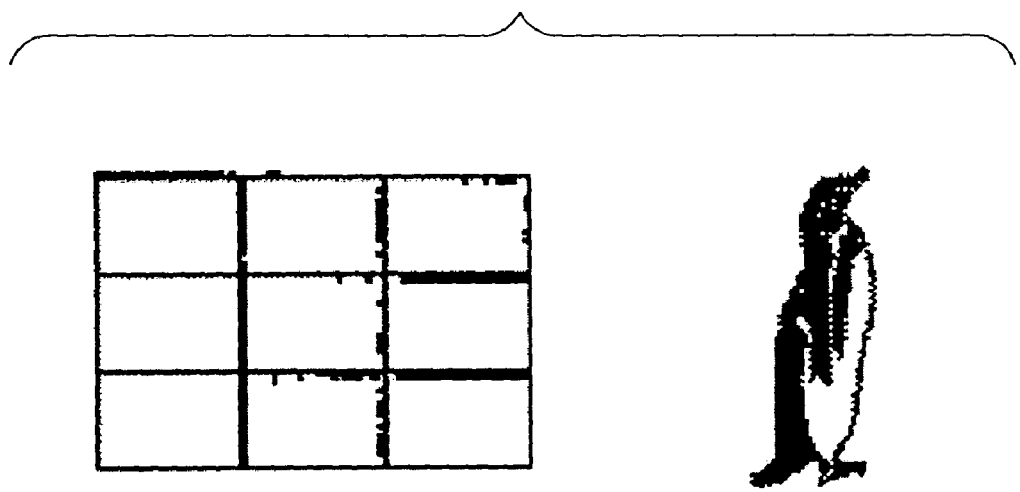
FIG. 13 shows examples of rectangular black pixel blocks and non-rectangular black pixel blocks.

At step S406, whether the outline of black pixels is almost rectangular in shape is checked, and if it is almost rectangular, processing proceeds to step S407. If it is not almost rectangular, it is determined that the black pixel block is "NONCHAR". Examples of rectangular black pixel blocks and non-rectangular black pixel blocks are shown in FIG. 13.

Figure 14A:
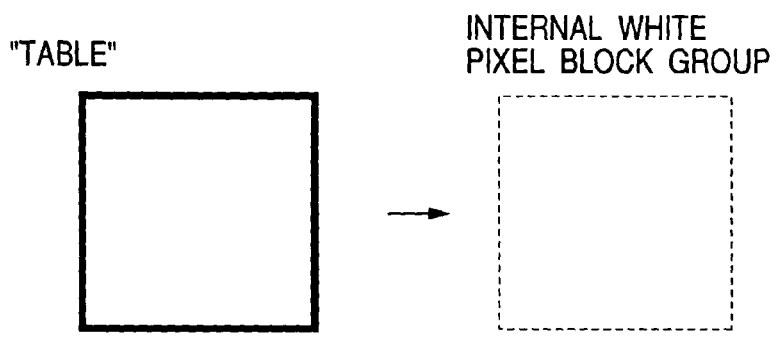
FIGS. 14A, 14B and 14C show examples of arrangement states of white pixels blocks in black pixel blocks.
Figure 14B:
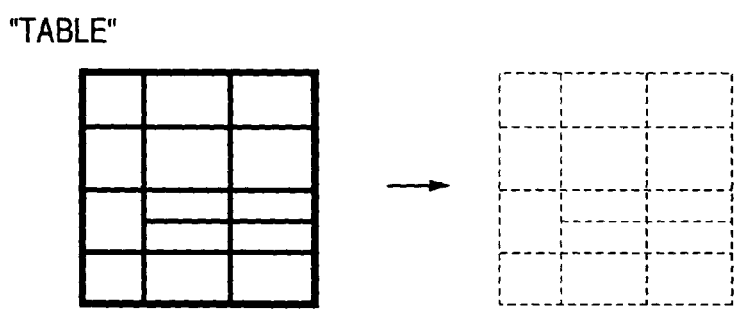
Figure 14C:
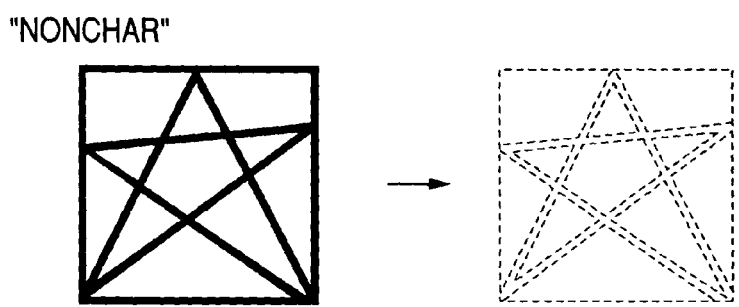

At step S407, it is determined that the arrangement of white pixel blocks is good if all white pixel blocks sampled from the inside of the black pixel block considered as being almost rectangular in shape are almost oblong in shape, and they occupy the inside of the black pixel block leaving almost no gaps (subscribed rectangles of white pixel blocks do not overlap one another so that the white pixel blocks are arranged orderly). An attribute of "TABLE" is given to a black pixel block in which the arrangement of internal white pixel blocks is good, while an attribute of "NONCHAR" is given to a black pixel block in which the arrangement of internal white pixel blocks is bad. Examples of arrangement of internal white pixel blocks are shown in FIGS. 14A to 14C. FIGS. 14A and 14B show examples of black pixel blocks classified as "TABLE" because the arrangement of internal white pixel blocks is good, and FIG. 14C shows an example of a black pixel block classified as "NONCHAR" because the arrangement of internal white pixel blocks is bad.

At step S408, with attention focused on white pixel blocks existing in a black pixel block classified as "NONCHAR" or "TABLE", and for the insides of the white pixel blocks, black pixel blocks are sampled in the same manner as in step S401 to carry out classification processing similar to that of S402 to S407.

By processing of S401 to S408, black pixel blocks in an image, and white pixel blocks in the black pixel block are sampled, and black pixel blocks are recursively sampled from white pixel blocks inside the "TABLE" and "NON-CHAR".

A tree structure is created using pixel blocks existing in each pixel block as child nodes for black pixel blocks and white pixel blocks obtained by carrying out processing shown in FIG. 4. At this time, in the tree structure, attributes classified at steps S402 to S407 are given to black pixel blocks, and an attribute of "WHITE" is given to white pixel blocks. For example, if pixel block sampling is carried out for FIG. 15, then data having a tree structure shown in FIG. 16 is obtained. Furthermore, in FIG. 16, the number of pixel blocks and the like are partially omitted for simplification of the drawing, but nodes of a large number of pixel blocks actually exist. In the tree of FIG. 16, it is the white pixel block that corresponds to the "WHITE" node, and the attribute of "WHITE" corresponding to the entire image is given to the root of the tree for the sake of convenience. That is, in the tree structure shown in FIG. 16, if the "WHITE" attribute is considered as a background and other attributes such as "CHAR", "TABLE" and "LINE" are considered as foregrounds, the parent node and child node have the background and foreground appearing alternatively in the tree structure of FIG. 16. Furthermore, each node of the tree structure includes area information (segment information) and the attribute of the pixel block.

Figure 3:
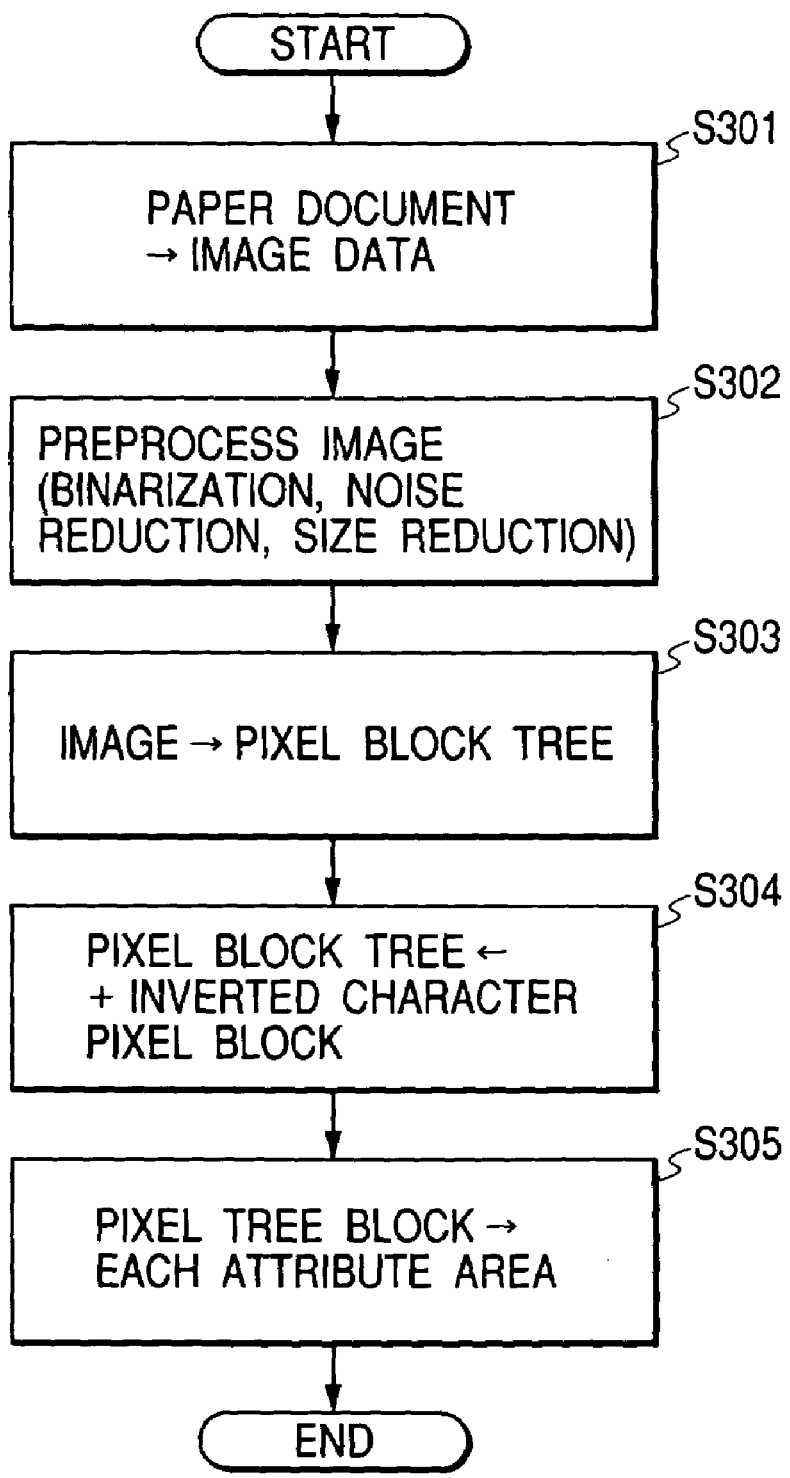
FIG. 3 is a flowchart for explaining area division processing of the first embodiment.
Figure 6:
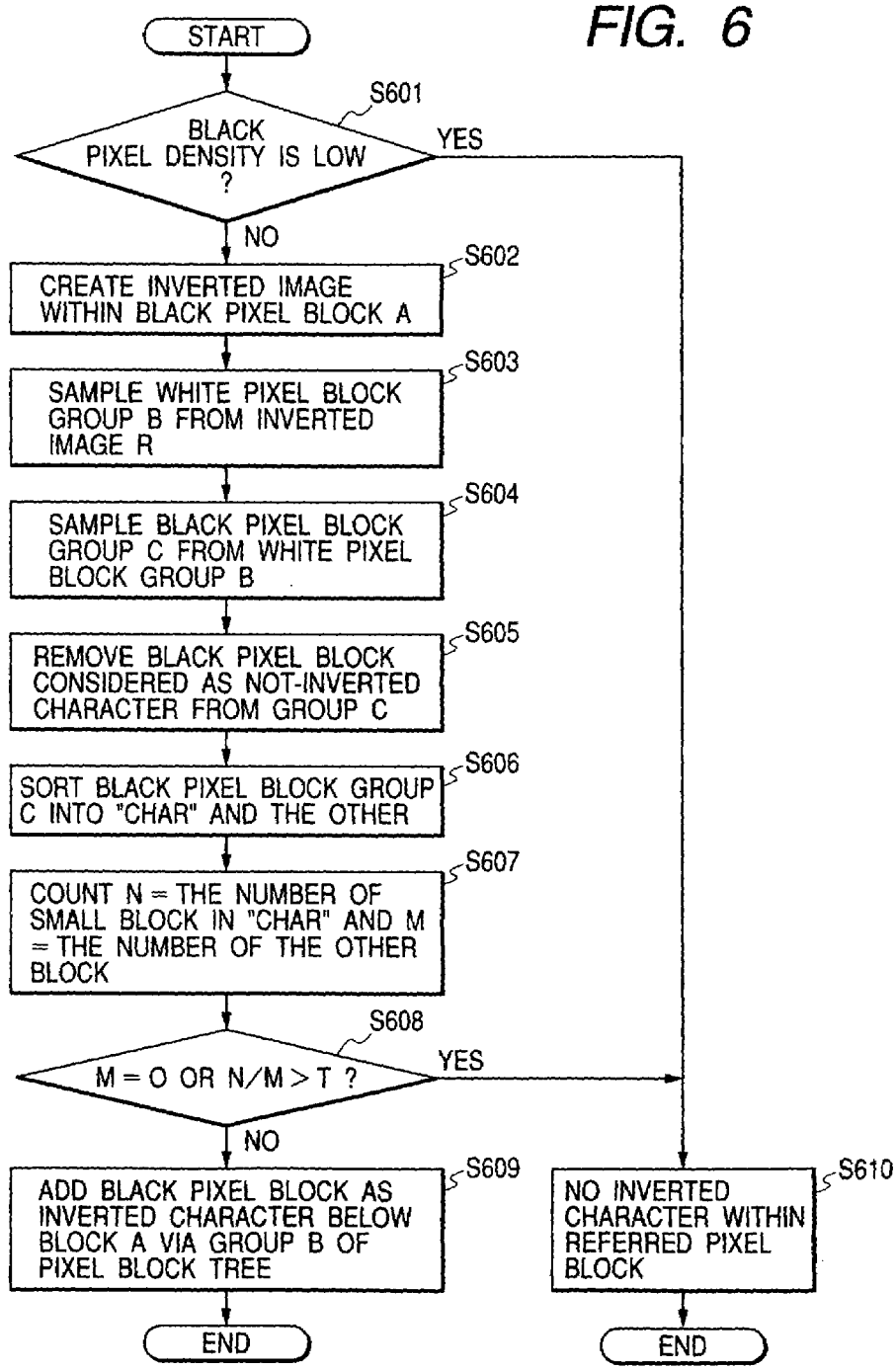
FIG. 6 is a flowchart for explaining inverted character sampling processing.

After the tree structure of pixel blocks is obtained as described above, attention is focused on a black pixel block given the attribute of "NONCHAR" or "TABLE" in the pixel block tree structure, and the sampling of pixel blocks intended for sampling inverted characters on a black ground in this black pixel block is carried out as additional processing in the area division unit 103 at step S304 of FIG. 3. A specific example of processing will be described below using FIG. 6.

At step S601, the possibility that inverted characters exist in a black pixel block A is estimated on the analogy of the geometric characteristics of the focused black pixel block (black pixel block A). Here, if the black pixel density is extremely low, i.e. for a black pixel block like a linear skeletal structure, it is determined that the black pixel block includes no inverted characters. Furthermore, the black pixel density is a value calculated from {(the number of pixels having a pixel value of 1 in all segments of the black pixel block)/P where P is a number of total pixels of all segments of the black pixel block (areas of the black pixel block shown by the example 803 in FIG. 8). Complicated analysis processing such as S602 to S608 can be skipped if it can be determined that the possibility that inverted characters exist is very low, by using processing enabling easy calculation such as the black pixel density, thus making it possible to carry out processing quickly.

Figure 17:
FIG. 17 shows an example of an image created for sampling inverted characters.

At step S602, an image R with pixel values (0 and 1) of pixels in the black pixel block A inverted is created. At this time, for pixels constituting the outline of the black pixel block A, the pixel values are kept at 1 without being inverted. FIG. 17 shows an example of creating the image R.

Furthermore, if area division processing (pixel block sampling) in step S303 is carried out using an image scaled down at S302, an image obtained by sampling an area corresponding to the area of the focused black pixel block from the pre-scaledown original, inverting pixel values (0 and 1) for the sampled area (pixels of the outline are not inverted), and subjecting the sampled area for which pixel values have been inverted to OR scaledown processing is defined as an inverted image R in step S602. Otherwise, an inverted character part is likely broken in the image subjected OR scaledown in area division processing. Because a pre-scaledown image is inverted before it is scaled down in this way, the inverted character part can be prevented from being broken and blurred.

At step S603, processing similar to that of S405 is carried out to sample white pixel blocks surrounded by 4 connected lines (white pixel block set C) for the inside of the inverted image R.

At step S604, black pixel blocks (black pixel blocks surrounded by 8 connected lines) are sampled from the inside of the white pixel block set B sampled at step S603. The sampled black pixel block set is defined as C.

At step S605, a white pixel block set inside the pre-inversion black pixel block A is sampled, and white pixel blocks each having a predetermined size or greater size, of the white pixel block set in the pre-inversion black pixel block A, is considered as not-inverted characters (outlined characters), and are compared with the black pixel block set C obtained at step S604 to remove black pixel blocks overlapping with the white pixel blocks each having a predetermined size or greater size on the coordinate from the set C. Because a white pixel block is sampled from the inside of the pre-insertion black pixel block A to make a determination, it can easily be determined in advance that the block is not an inverted character but a background. In addition, in the black pixel block A in an image obtained by simply subjecting the original image to OR scaledown, even if white pixel blocks are broken, there is no possibility that white pixel blocks separated from each other in the original image are combined into one white pixel block, thus making it possible to correctly take out a part considered as a background (on the other hand, if a black pixel block is sampled in an image obtained by inverting and then scaling down the original image, white pixel blocks separated from each other in the original image may be combined into a black pixel block, and the white pixel background part and inverted character part of the original image may thus be combined if they are close to each other and in this case, the inverted character may also be removed, and therefore white pixel blocks are sampled from the pre-inversion black pixel block A at S605).

Figure 9:
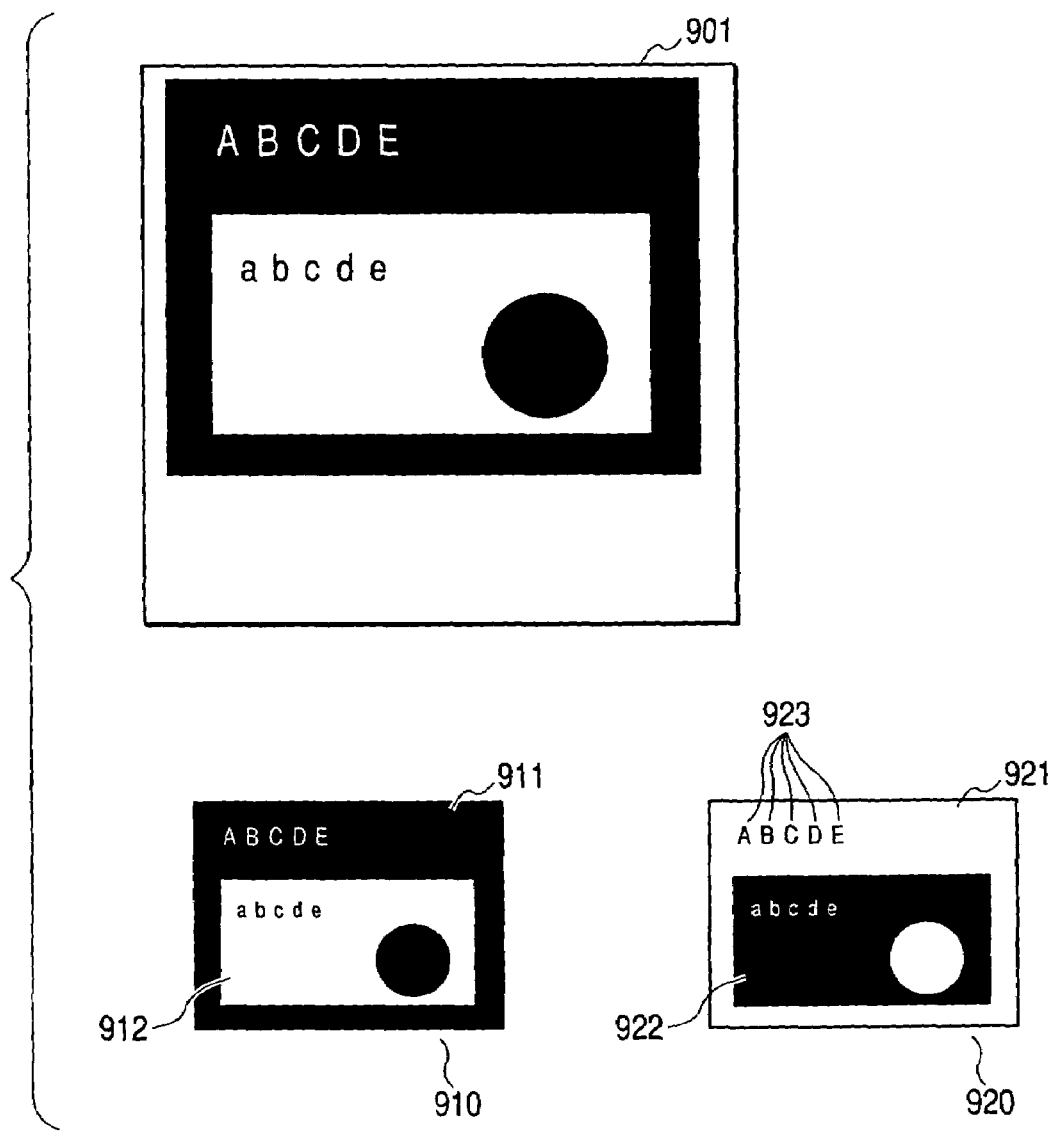
FIG. 9 shows an example of inverted character sampling processing.

An example of processing carried out at steps S602 to S605 is shown in FIG. 9. Provided that a black pixel block sampled by area division processing of S303 from an image obtained by subjecting an original image 901 to OR scaledown at S302 is a block 910, an inverted image created by inverting/scaling down the original image of an area corresponding to this black pixel block is an image 920. If an area 912 of a white pixel block existing in the black pixel block 910 (sampled as a black pixel block 922 in a white pixel block 921 on the inverted image 920) is clearly considered as a not-inverted character (e.g. it is considered as a not-character if its size is larger than a predetermined size), black pixel block 922 overlaps in position with the white pixel block 912, and is therefore removed. As a result, a black pixel block set 923 corresponding to the inverted character part remains.

At step S606, black pixel blocks in the set C are classified as "CHAR" and other attributes based on a determination criterion equivalent to that of S402 (based on whether or not equal to or less than a predetermined threshold value).

At step S607, "CHAR" black pixel blocks are classified as those having very small sizes and others. The number of the former and the latter are N and M, respectively.

At this step, N is considered as the number of pixel blocks originating from noises, and N is compared with the number M of other pixel blocks to determine whether the pixel block is a set of characters or not. Here, if M equals 0 or N/M equals a predetermined ratio T or greater ratio, the pixel block is considered as a not-character, and processing proceeds to step S610. In other cases, processing proceeds to step S609.

At step S609, a tree structure having a white pixel block as a parent node is created with "CHAR" black pixel blocks as pixel blocks of inverted characters, and the pixel block tree is updated so that blocks are added just below the original black pixel block A. Furthermore, for the white pixel block as a parent node, the white pixel block B may be simply used, or an area circumscribed with pixel blocks of inverted characters may be defined as the white pixel block.

By using a white pixel block as a parent node in this way, an inverted character can be added as a foreground of the tree structure while retaining the characteristics of the tree structure such that the background and foreground appear alternatively in the relation between the parent node and the child node.

Figure 15:
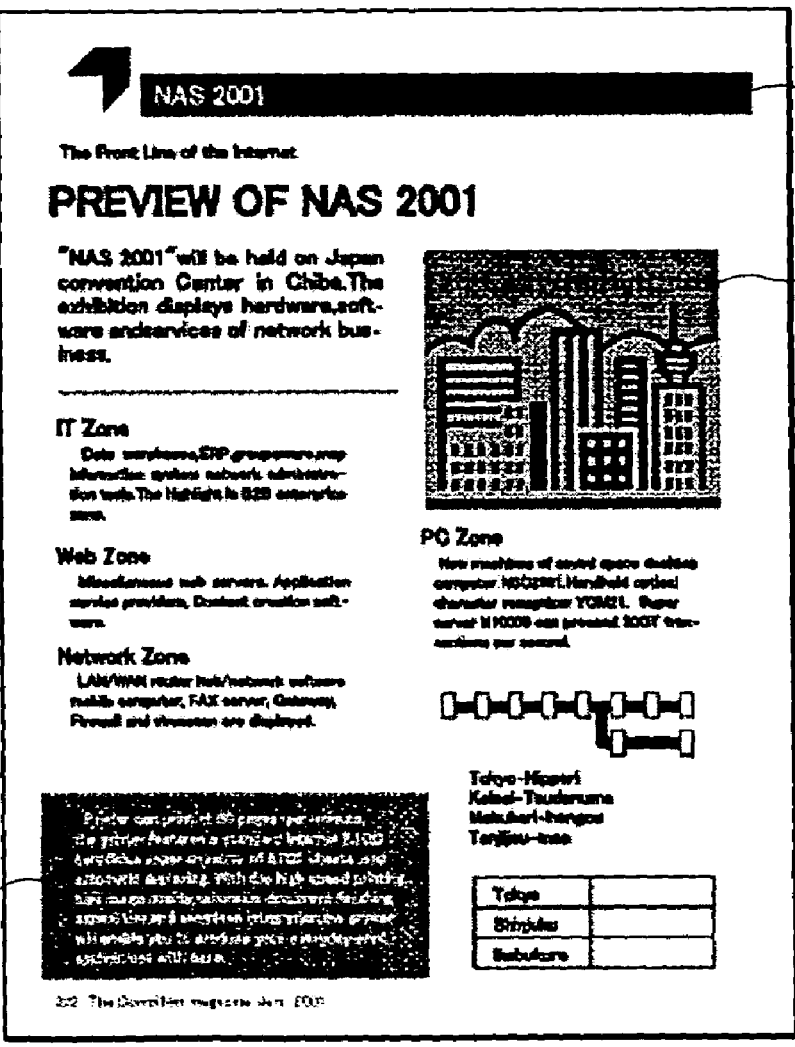
FIG. 15 shows an example of a binary image as an input of area division processing.
Figure 16:
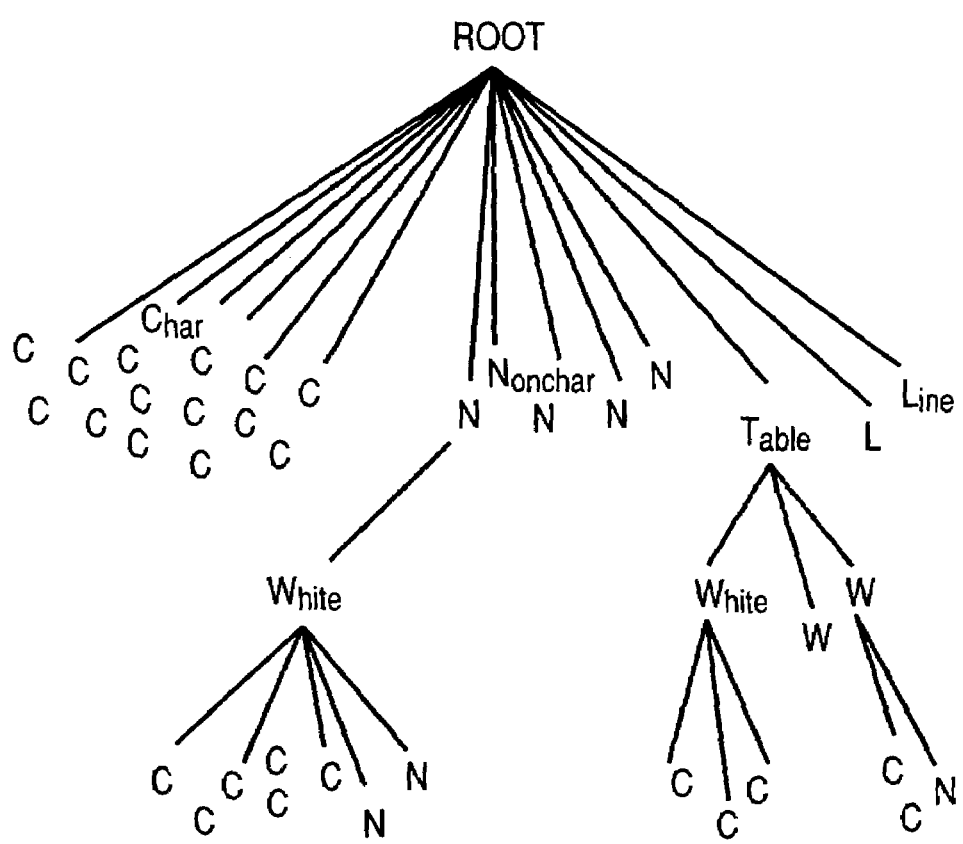
FIG. 16 shows an example of a tree structure of pixel blocks.
Figure 18:
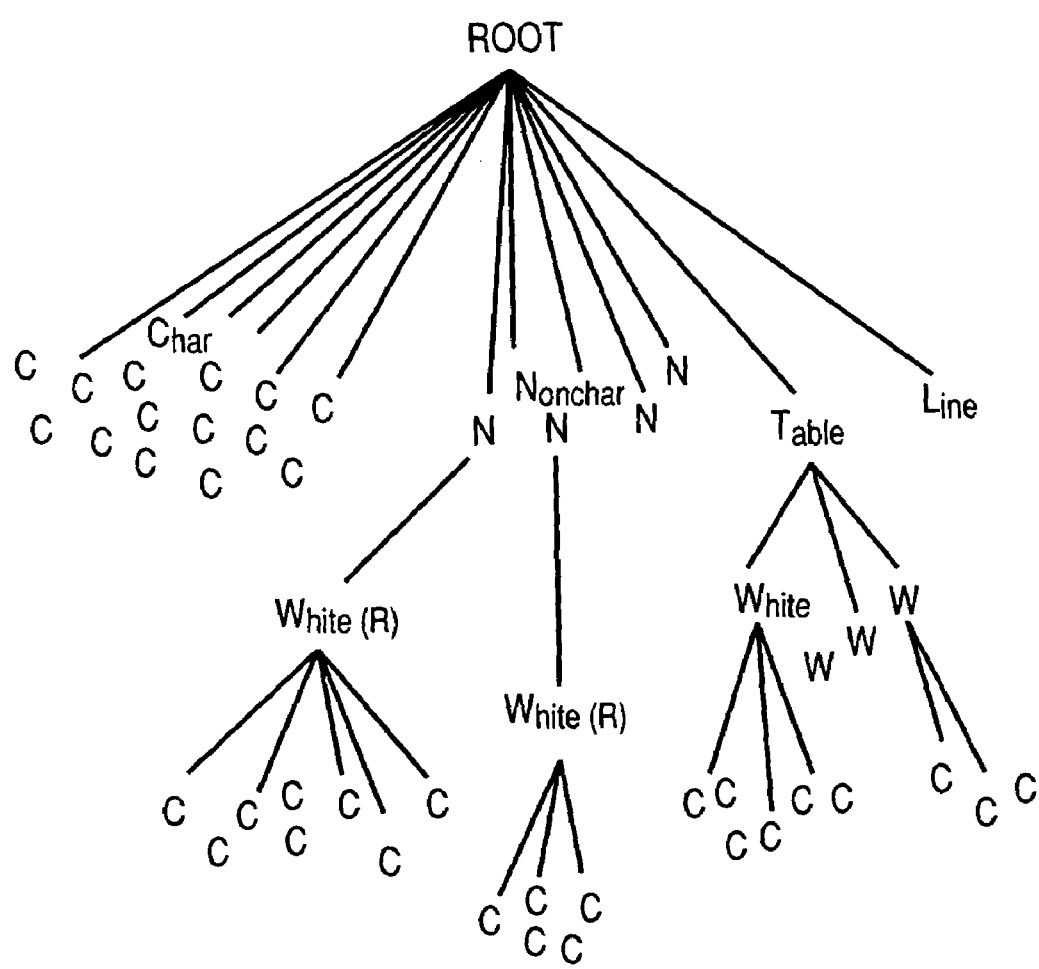
FIG. 18 shows an example of a tree structure of pixel blocks to which inverted characters are applied.

In the example of FIG. 15, inverted character sampling/determination processing is carried out for three black pixel blocks 1501, 1502 and 1503, and if pixel blocks of inverted characters are sampled from black pixel blocks 1501 and 1503 based on determination form the noise ratio and the like, the tree of FIG. 16 is updated to a tree shown in FIG. 18. A virtual white pixel block inserted at this time is considered as being equivalent to a normal "WHITE" pixel block except that information indicating that it is a ground of an inverted character is included. Such a white pixel block is described as "WHITE (R)" in this embodiment.

Figure 7:
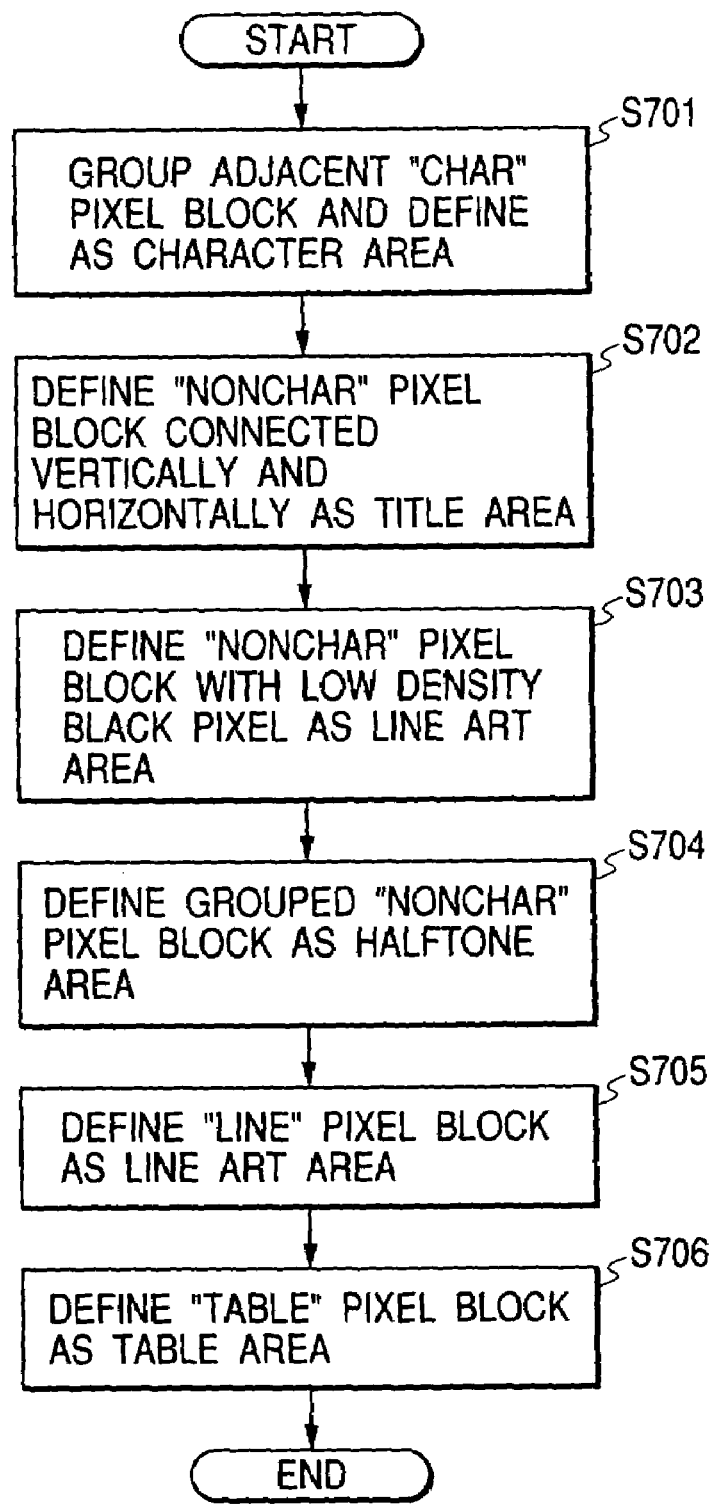
FIG. 7 is a flowchart for explaining area classification processing.

Referring to FIG. 3 again, the area definition unit 1033 uses the tree structure of pixel blocks and the classification result to divide images into rectangular areas such as characters/images/tables/lines at step S305. Furthermore, pixel blocks sampled at step S303 and pixel blocks added step S304 retain the characteristics of the tree structure, and therefore can be divided with same processing without discrimination. Processing of classification and area formation of these pixel blocks will be described using FIG. 7.

At step S701, attention is focused on pixel blocks classified as "CHAR", and those existing within a fixed distance longitudinally or laterally are grouped. Rectangles surrounding the groups are character areas. Furthermore, whether a character string in the character area extends in a lateral direction or longitudinal direction is checked. For example, horizontal distances between pixel blocks in the area and left and right closest pixel blocks, and vertical distances between pixel blocks in the area and upper and lower closest pixel blocks are determined, and a direction whose average of the distances is smaller may be defined as the direction of the character string.

At step S702, a set of pixel blocks connected longitudinally or laterally in approximate same sizes, of "NONCHAR" pixel blocks, is detected, and these pixel blocks are grouped as a title character area.

At step S703, pixel blocks whose ratios of black pixels to white pixels in the outline are small, i.e. densities of black pixels are small, of "NONCHAR" pixel blocks, are sampled, and these pixel blocks are defined as a line drawing area.

At step S704, large pixel blocks whose densities of black pixels are high or pixel blocks gathering in an area, of "NONCHAR" pixel blocks, are grouped as a halftone area. The halftone area refers to a middle tone area such as a photograph. If "CHAR" or "LINE" pixel blocks are included in the halftone area, their original areas are abandoned, and these pixel blocks are integrated into a halftone area.

At step S705, a rectangle surrounding "LINE" pixel blocks is defined as a line area.

At step S706, a rectangle surrounding "TABLE" area is defined as a table area.

The above processing is performed for all black pixel blocks. However, the object for grouping is each set of black pixel blocks existing in one "WHITE" pixel block.

Figure 19:
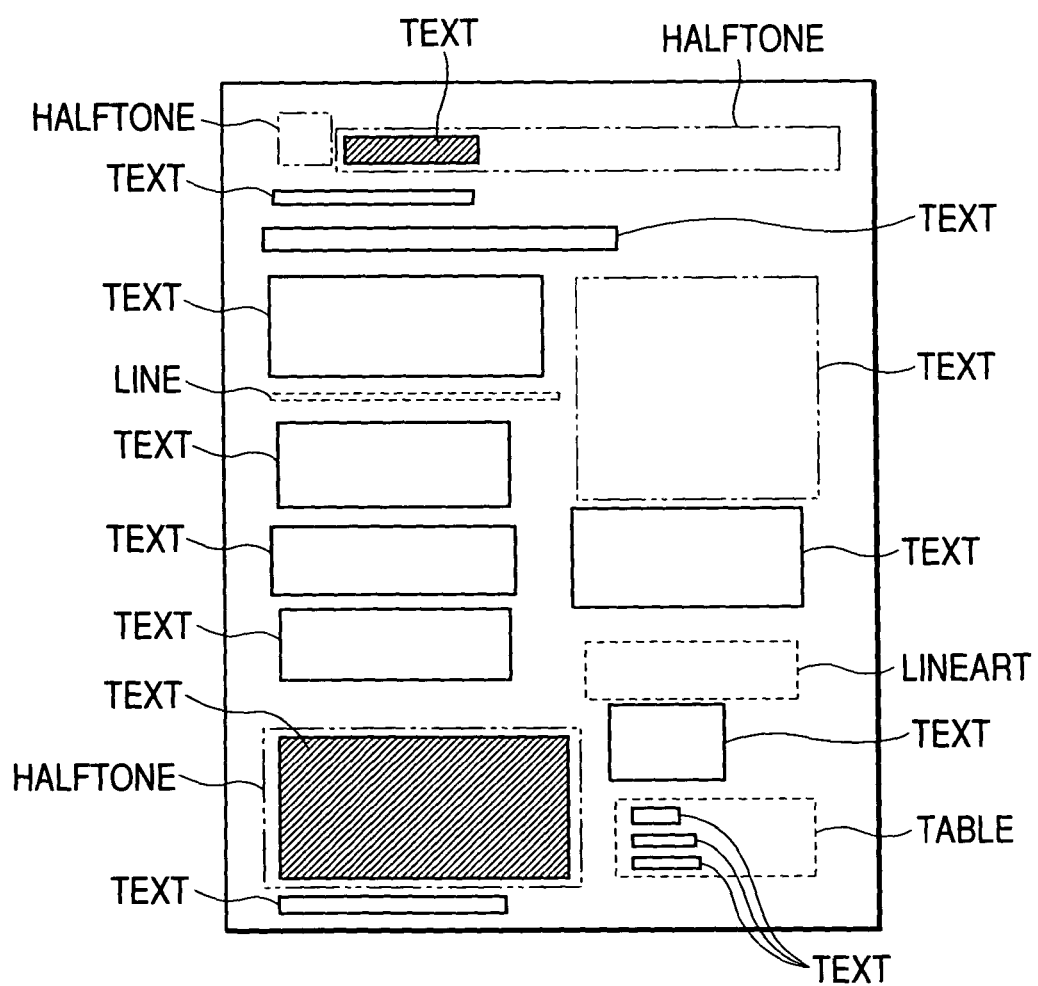
FIG. 19 shows an example of processing of division of an area including inverted character parts.
Figure 20:
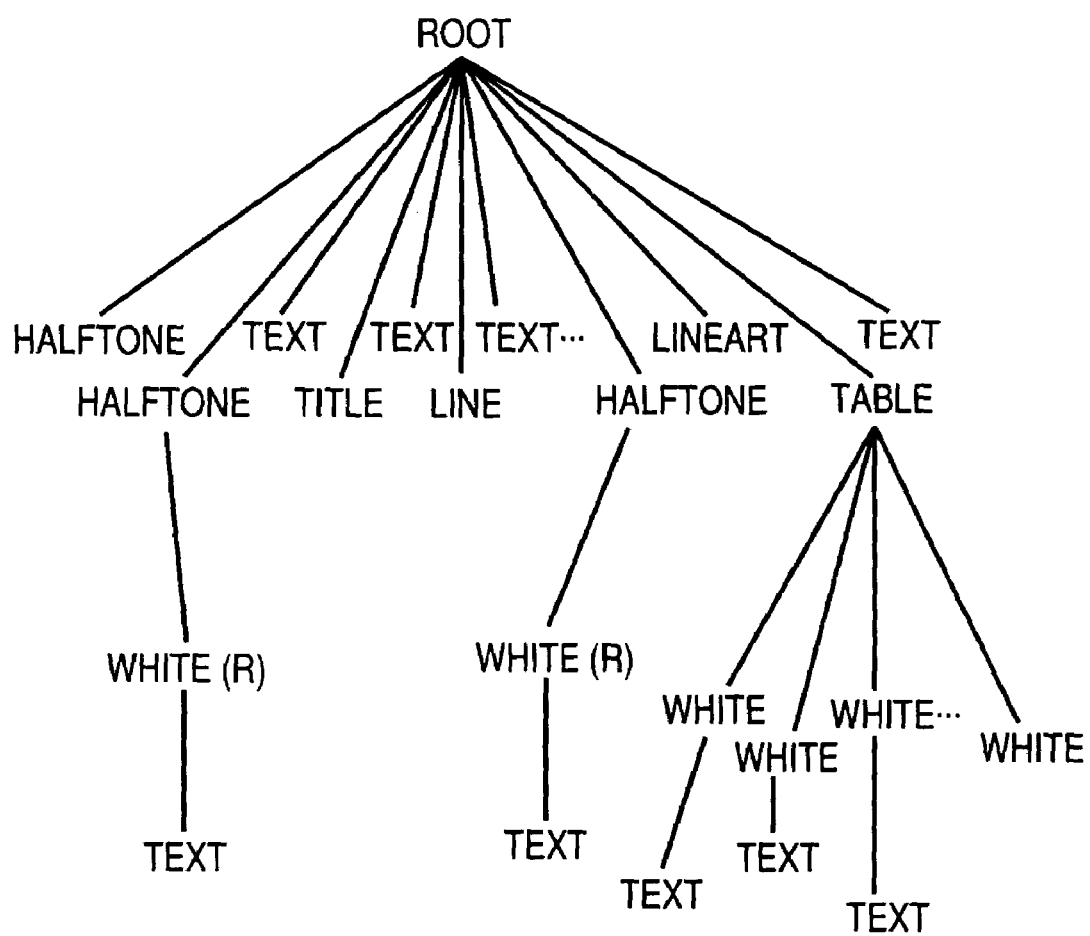
FIG. 20 shows an example of a tree structure of an area including inverted character parts.
Figure 21:
FIG. 21 shows an example of a document original to be subjected to area division.
Figure 22:
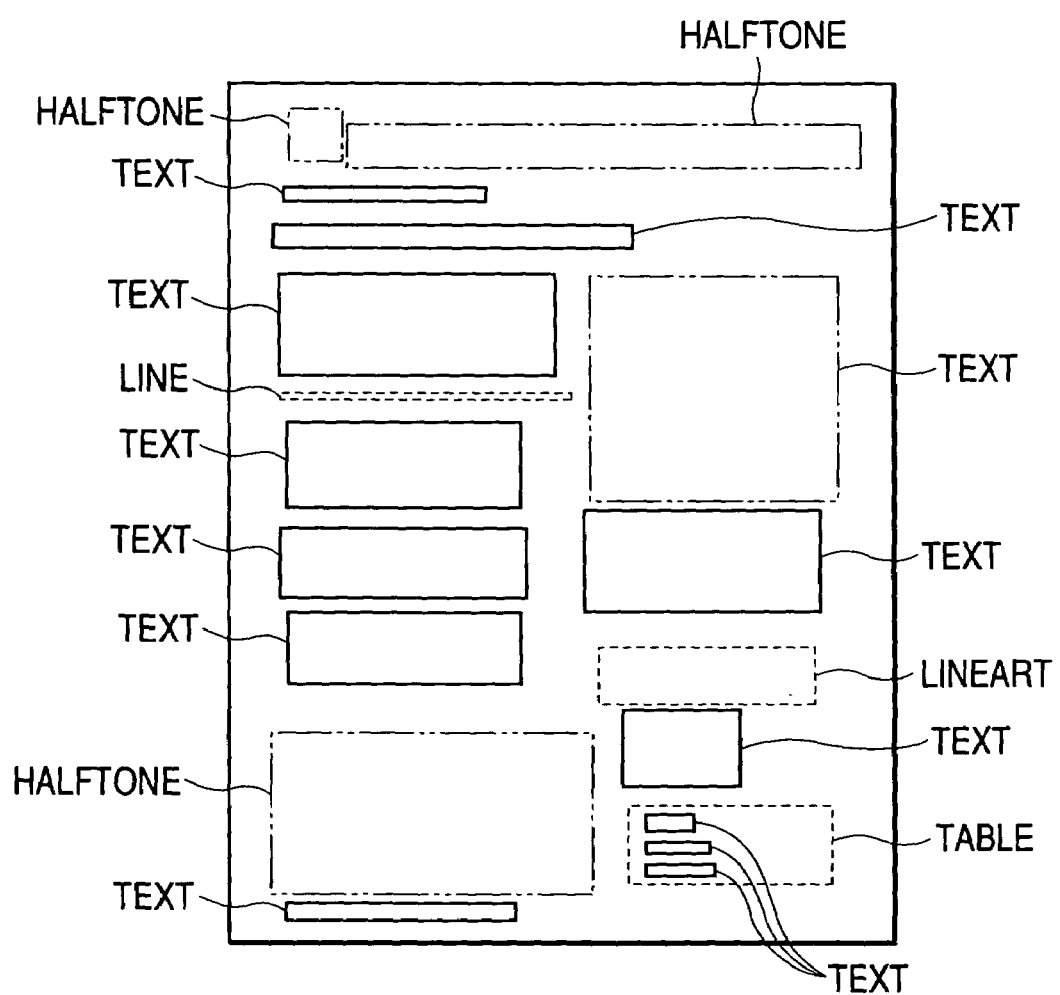
FIG. 22 shows an example of the result of conventional area division.
Figure 23:
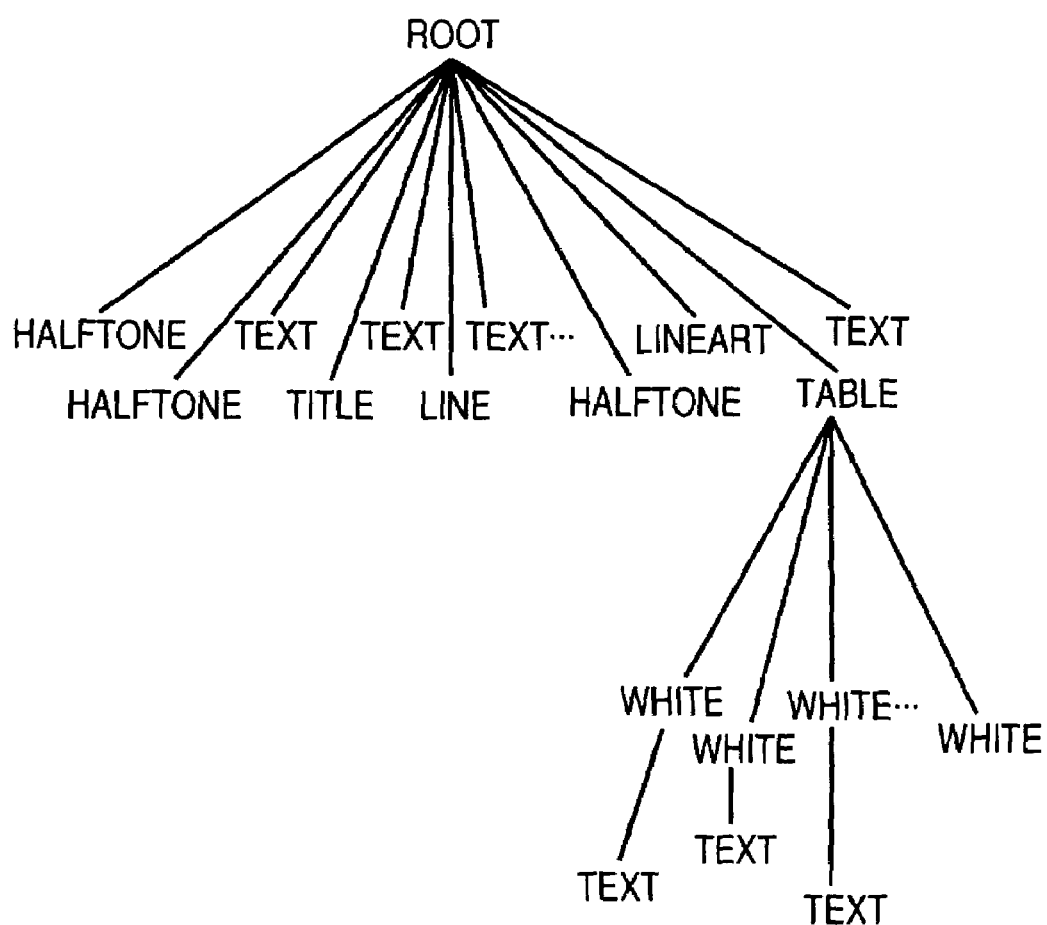
FIG. 23 shows an example of a conventional area tree structure.

For example, if a tree structure of pixel blocks shown in FIG. 18 is obtained from the image of FIG. 21, processing of S701 to S706 is further carried out to define areas different for each attribute shown in FIG. 19. At this time, an area tree structure shown in FIG. 20 is created between areas based on the configuration of the pixel block tree. In the output result of this area division processing, coordinate information of each area, and information of link to an area as a parent, and areas of children if any are retained.

Furthermore, in FIG. 19, the diagonally shaded text area is a text area sampled as inverted characters. This can be identified from the fact that it is a text existing below WHITE (R) in the tree structure of FIG. 20 from the output result. However, processing of S701 to S706 is carried out without discrimination of inverted areas, and therefore decision algorithms and the like can be made common for both non-inverted areas and inverted areas.

As described above, inverted characters (outlined characters) can be managed with a hierarchical tree structure same as that of normal characters.

In addition, when area division processing for dividing an image obtained by scanning a paper into part elements having different natures such as characters, graphics, photographs and tables is carried out, white-on-black character areas can be sampled using an area sampling method similar to that for black-on-white character areas.

What is claimed is:

1. An image processing method comprising:
   a first pixel block sampling step of recursively sampling black pixel blocks and white pixel blocks from a binary image;
   a tree structure creating step of creating tree structure data indicating a positional relation between the black pixel blocks and white pixel blocks sampled in said first pixel block sampling step;
   an inverted image creating step of creating an inverted image by white-black-inverting the insides of black pixel blocks that can include inverted characters, of black pixel blocks included in said tree structure data;

a second pixel block sampling step of sampling white pixel block and black pixel blocks from the inverted image created in said inverted image creating step; and a tree structure addition step of adding data regarding the white pixel blocks and black pixel blocks sampled in said second pixel block sampling step to corresponding nodes of said tree structure data.

2. The image processing method according to claim 1, wherein for the data regarding the white pixel blocks and black pixel blocks added in said tree structure addition step, data regarding white pixel blocks having data regarding the sampled black pixel blocks as child nodes is added as child nodes of the white-black-inverted black pixel blocks of said tree structure data.

3. The image processing method according to claim 1, wherein in said inverted image creating step, said inverted image is created by white-black inverting the pixels inside the black pixel blocks sampled in said first pixel block sampling step with the outline of the black pixel blocks constituted by black pixels.

4. The image processing method according to claim 1, further comprising an area division step of dividing said binary image into a plurality of areas by grouping black pixel blocks based on the tree structure data with data regarding white pixel blocks and black pixel blocks added in said tree structure addition step.

5. The image processing method according to claim 1, further comprising an area tree structure creating step of creating area tree structure data indicating a positional relation between a plurality of areas by grouping black pixel blocks based on the tree structure data with data regarding white pixel blocks and black pixel blocks added in said tree structure addition step.

6. The image processing method according to claim 1, wherein said black pixel block is an area surrounded by a black pixel outline obtained by performing eight direction outline tracking of black pixels, and said white pixel block is an area surrounded by white pixel outline obtained by performing four direction outline tracking of white pixels.

7. The image processing method according to claim 1, wherein said binary image is an image obtained by subjecting a binary original image to OR scaledown, and said inverted image is created based on the area of black pixel blocks to be white-black-inverted and an image obtained by white-black inverting said original image and subjecting the same to OR scaledown.

8. The image processing method according to claim 1, wherein in said inverted image creating step, an inverted image for black pixel blocks of low black pixel density, of black pixel blocks included in said tree structure data, is not created.

9. The image processing method according to claim 1, wherein the black pixel blocks sampled in said second pixel block sampling step are black pixel blocks remaining after removing black pixel blocks sampled from said inverted image that are located at positions corresponding to white pixel blocks each having a predetermined size or greater size, of white pixel blocks sampled from said binary image, from a plurality of black pixel blocks sampled from said inverted image.

10. The image processing method according to claim 1, wherein in said second pixel block sampling step, it is determined that black pixel blocks from which the inverted image is created include no inverted characters to end processing if the ratio of black pixel blocks originating from noises to a plurality of black pixel blocks extracted from said inverted image equals a predetermined value or greater value.

11. The image processing method according to claim 7, wherein said binary original image is an image converted by binarizing a multi-valued original image.

12. An image processing apparatus comprising:

first pixel block sampling means for recursively sampling black pixel blocks and white pixel blocks from a binary image;

tree structure creating means for creating tree structure data indicating a positional relation between the black pixel blocks and white pixel blocks sampled by said first pixel block sampling means;

inverted image creating means for creating an inverted image by white-black-inverting the insides of black pixel blocks that can include inverted characters, of black pixel blocks included in said tree structure data;

second pixel block sampling means for sampling white pixel block and black pixel blocks from the inverted image created by said inverted image creating means; and tree structure addition means for adding data regarding the white pixel blocks and black pixel blocks sampled by said second pixel block sampling means to corresponding nodes of said tree structure data.

13. The image processing apparatus according to claim 12, wherein for the data regarding the white pixel blocks and black pixel blocks added by said tree structure addition means, data regarding white pixel blocks having data regarding the sampled black pixel blocks as child nodes is added as child nodes of the white-black-inverted black pixel blocks of said tree structure data.

14. The image processing apparatus according to claim 12, wherein said inverted image creating means creates said inverted image by white-black inverting the pixels inside the black pixel blocks sampled by said first pixel block sampling means with the outline of the black pixel blocks constituted by black pixels.

15. The image processing apparatus according to claim 12, further comprising area division means for dividing said binary image into a plurality of areas by grouping black pixel blocks based on the tree structure data with data regarding white pixel blocks and black pixel blocks added by said tree structure addition means.

16. The image processing apparatus according to claim 12, further comprising area tree structure creating means for creating area tree structure data indicating a positional relation between a plurality of areas by grouping black pixel blocks based on the tree structure data with data regarding white pixel blocks and black pixel blocks added by said tree structure addition means.

17. The image processing apparatus according to claim 12, wherein said black pixel block is an area surrounded by a black pixel outline obtained by performing eight direction outline tracking of black pixels, and said white pixel block is an area surrounded by white pixel outline obtained by performing four direction outline tracking of white pixels.

18. The image processing apparatus according to claim 12, wherein said binary image is an image obtained by subjecting a binary original image to OR scaledown, and said inverted image is created based on the area of black pixel blocks to be white-black-inverted and an image obtained by white-black inverting said original image and subjecting the same to OR scaledown.

19. The image processing apparatus according to claim 12, wherein said inverted image creating means does not create an inverted image for black pixel blocks of low black pixel density, of black pixel blocks included in said tree structure data.

20. The image processing apparatus according to claim 12, wherein the black pixel blocks sampled by said second pixel block sampling means are black pixel blocks remaining after removing black pixel blocks sampled from said inverted image that are located at positions corresponding to white pixel blocks each having a predetermined size or greater size, of white pixel blocks sampled from said binary image, from a plurality of black pixel blocks sampled from said inverted image.

21. The image processing apparatus according to claim 12, wherein said second pixel block sampling means determines that black pixel blocks from which the inverted image is created include no inverted characters to end processing if the ratio of black pixel blocks originating from noises to a plurality of black pixel blocks extracted from said inverted image equals a predetermined value or greater value.

22. The image processing apparatus according to claim 18, wherein said binary original image is an image converted by binarizing a multi-valued original image.

23. A computer readable storage medium including a computer readable image processing program, the image processing program comprised of codes for making a computer perform:
　a first pixel block sampling step of recursively sampling black pixel blocks and white pixel blocks from a binary image;
　a tree structure creating step of creating tree structure data indicating a positional relation between the black pixel blocks and white pixel blocks sampled in said first pixel block sampling step;
　an inverted image creating step of creating an inverted image by white-black-inverting the insides of black pixel blocks that can include inverted characters, of black pixel blocks included in said tree structure data;
　a second pixel block sampling step of sampling white pixel block and black pixel blocks from the inverted image created in said inverted image creating step; and
　a tree structure addition step of adding data regarding the white pixel blocks and black pixel blocs sampled in said second pixel block sampling step to corresponding nodes of said tree structure data.

* * * * *

UNITED STATES PATENT AND TRADEMARK OFFICE
CERTIFICATE OF CORRECTION

PATENT NO. : 7,298,900 B2
APPLICATION NO. : 10/667413
DATED : November 20, 2007
INVENTOR(S) : Tomotoshi Kanatsu It is certified that error appears in the above-identified patent and that said Letters Patent is hereby corrected as shown below:

TITLE PAGE [57] ABSTRACT:

Line 14, "black pixel blacks" should read --black pixel blocks--.

TITLE PAGE [57] ABSTRACT:

Line 16, "blocs" should read --blocks--.

COLUMN 2:

Line 14, "blocs" should read --blocks--.

COLUMN 3:

Line 18, "block" should read --blocks--.

COLUMN 4:

Line 45, "it" should read --if it--.

COLUMN 6:

Line 6, "insides" should read --inside--.

COLUMN 7:

Line 63, "block)/P" should read --block)/P}--.

COLUMN 9:

Line 42, "form" should read --of--.

COLUMN 11:

Line 2, "block" should read --blocks--; and
Line 39, "white" should read --a white--.

COLUMN 12:

Line 20, "block" should read --blocks--; and
Line 57, "white" should read --a white--.

UNITED STATES PATENT AND TRADEMARK OFFICE
CERTIFICATE OF CORRECTION

PATENT NO. : 7,298,900 B2
APPLICATION NO. : 10/667413
DATED : November 20, 2007
INVENTOR(S) : Tomotoshi Kanatsu It is certified that error appears in the above-identified patent and that said Letters Patent is hereby corrected as shown below:

COLUMN 14:

Line 17, "block" should read --blocks--; and
Line 20, "blocs" should read --blocks--.

Signed and Sealed this

Ninth Day of September, 2008

JON W. DUDAS
*Director of the United States Patent and Trademark Office*